US009888165B2

(12) United States Patent
Tamaki (10) Patent No.: US 9,888,165 B2
(45) Date of Patent: Feb. 6, 2018

(54) IMAGE CAPTURING APPARATUS, CONTROL METHOD THEREFOR AND STORAGE MEDIUM (71) Applicant: CANON KABUSHIKI KAISHA, Tokyo (JP)

(72) Inventor: Yoshihito Tamaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1 day.

(21) Appl. No.: 15/245,612

(22) Filed: Aug. 24, 2016

(65) Prior Publication Data
US 2017/0064190 A1 Mar. 2, 2017

(30) Foreign Application Priority Data
Aug. 25, 2015 (JP) ................................. 2015-166182

(51) Int. Cl.
H04N 5/232 (2006.01)
G03B 13/36 (2006.01)

(52) U.S. Cl.
CPC ..... H04N 5/23212 (2013.01); H04N 5/23245 (2013.01); G03B 13/36 (2013.01)

(58) Field of Classification Search
CPC ........... H04N 5/23212; H04N 5/23287; H04N 5/2351; G03B 13/36; G02B 7/34; G02B 7/36; G06T 7/215
See application file for complete search history.

(56) References Cited

U.S. PATENT DOCUMENTS

| 6,448,545 | B1* | 9/2002 | Chen | A61B 1/042 250/208.1 |
| 6,819,360 | B1* | 11/2004 | Ide | H01L 27/14627 257/E27.131 |
| 2008/0017901 | A1* | 1/2008 | Sato | H04N 3/1568 257/292 |
| 2008/0084483 | A1* | 4/2008 | Kusaka | H04N 5/23212 348/222.1 |
| 2015/0042849 | A1* | 2/2015 | Negishi | H04N 5/2356 348/251 |

FOREIGN PATENT DOCUMENTS

| JP | 04-015629 A | 1/1992 |
| JP | 2008-052009 A | 3/2008 |
| JP | 2013-011783 A | 1/2013 |

* cited by examiner

Primary Examiner — Trung Diep
(74) Attorney, Agent, or Firm — Cowan, Liebowitz & Latman, P.C.

(57) ABSTRACT

An image capturing apparatus includes an image sensor having a pair of focus detection pixels; a detection circuit for performing, on a pair of image signals that were obtained from each of the focus detection pixels, shift processing for relatively shifting the pair of image signals, and detecting a phase difference of the pair of image signals; a switching circuit for switching between a starlit sky image capture mode and a normal image capture mode; and a control circuit for performing control such that a shift amount of one step by which the pair of image signals are relatively shifted in the starlit sky image capture mode is smaller than a shift amount of one step by which the pair of image signals are relatively shifted in the normal image capture mode.

10 Claims, 6 Drawing Sheets

IMAGE CAPTURING APPARATUS, CONTROL METHOD THEREFOR AND STORAGE MEDIUM

BACKGROUND OF THE INVENTION

Field of the invention

The present invention relates to a focus adjustment technique in an image capturing apparatus such as a digital camera or a video camera.

Description of the Related Art

Conventionally, in image capturing apparatuses having a mode for performing image capture of a starlit sky, generally, the focus lens is moved to the infinity focal position of the imaging optical system and an image is then captured, using the fact that stars exist at an infinite distance, rather than adopting the final in-focus position obtained by autofocus. For example, Japanese Patent Laid-Open No. 4-15629 discloses a technique for, when performing image capture of stars, setting the image capture lens at the infinity focal position under a predetermined exposure condition, and starting the exposure operation when a predetermined time has elapsed after operating the release button.

However, in the technique disclosed in Japanese Patent Laid-Open No. 4-15629 above, the focus lens is moved to the infinity focal position set by design, and thus there are cases where the infinity focal position set by design shifts due to change over time, change in environmental temperature, camera orientation change and the like. Therefore, there is an issue that image capture is not necessarily performed in an in-focus state.

In order to solve this, it is effective to perform focus adjustment by an AF (autofocus) function. Conventionally, as an AF system, a contrast AF system for performing focus detection by extracting specific frequency components of imaging signals (so-called band pass filter processing) and performing contrast evaluation has been widely used.

However, in automatic focus adjustment based on a contrast AF system, focus detection needs to be performed using the contrast evaluation values of a plurality of frames. In that case, if the entire image is dark as with a starlit sky, and stars, which are to be a subject, are small, the exposure time for one frame needs to be extended in order to obtain a necessary contrast, and thus there is an issue that focus adjustment takes time.

Moreover, in automatic focus adjustment based on a contrast AF system, the peak of the contrast evaluation values is detected from the contrast evaluation values of a plurality of frames, and thus the peak of the contrast evaluation value needs to be passed. Therefore, there is an issue that in moving image capture and the like, reciprocal motion of the focus lens appears in images, and the quality of the images is reduced.

In view of this, as an AF system, Japanese Patent Laid-Open No. 2008-52009 discloses an apparatus that performs focus detection based on pupil division using a two-dimensional image sensor in which each of the pixels has a microlens formed thereon. In this apparatus, a configuration is adopted in which the photoelectric conversion portion of each of the pixels that constitute the image sensor is divided into a plurality of sections, and the divided photoelectric conversion portions receive, via the microlenses, light flux that passed through different areas of the pupil of the image capture lens. Phase difference calculation for calculating a phase difference that is a deviation amount is performed for a pair of output signals of the photoelectric conversion portions that receive the light flux that passed through the different areas of the pupil of this image capture lens, and a defocus amount (Def) can then be calculated from the phase difference.

In addition, Japanese Patent Laid-Open No. 2013-11783 discloses a focus detection apparatus that changes a shift amount in phase difference detection AF in accordance with an aperture value. In this focus detection apparatus, the higher the aperture value is, the more the light flux that enters is restricted, and the smaller the distance between the centroids of two images used in phase difference detection AF becomes, and thus the shift amount is reduced. Accordingly, the time required to calculate the defocus amount (Def) can be shortened.

However, in image capture of a starlit sky, the entire sky is dark, and thus there is desire to add pixel signals in the readout direction in order to improve the S/N ratio. However, on the other hand, the sizes of the stars in the sky are extremely small, and if the pixel signals are added, the resolution decreases, making it difficult to detect the stars. Therefore, in order to improve the S/N ratio and not reduce the resolution, it is necessary to perform image capture with a bright f-number (in a state where the diaphragm is open) without adding the pixel signals in the readout direction. However, in the method described in Japanese Patent Laid-Open No. 2013-11783, if the diaphragm is opened, the shift amount between two images increases, and it takes a long time to calculate the defocus amount (Def).

SUMMARY OF THE INVENTION

The present invention has been made in light, of the above issues, and provides an image capturing apparatus that can perform high-speed and accurate focus adjustment in the case of performing image capture of a starlit sky.

According to a first aspect of the present invention, there is provided an image capturing apparatus comprising: an image sensor having a pair of focus detection pixels that each receive light that passed through different exit pupil areas of an imaging optical system; a detection unit configured to perform, on a pair of image signals that were obtained from each of the focus detection pixels and respectively correspond to the different exit pupil areas, shift processing for relatively shifting the pair of image signals, and detect a phase difference of the pair of image signals; a switching unit configured to switch between a starlit sky image capture mode for performing image capture of a starlit sky and a normal image capture mode for performing normal image capture; and a control unit configured to perform control such that a shift amount of one step by which the pair of image signals are relatively shifted in the shift processing in a case where the starlit sky image capture mode is selected by the switching unit is smaller than a shift amount of one step by which the pair of image signals are relatively shifted in a case where the normal image capture mode is selected.

According to a second aspect of the present invention, there is provided a control method for an image capturing apparatus including an image sensor having a pair of focus detection pixels that each receive light that passed through different exit pupil areas of an imaging optical system, the method comprising: performing, on a pair of image signals that were obtained from each of the focus detection pixels and respectively correspond to the different exit pupil areas, shift processing for relatively shifting the pair of image signals, and detecting a phase difference of the pair of image signals; switching between a starlit sky image capture mode for performing image capture of a starlit sky and a normal image capture mode for performing normal image capture; and performing control such that a shift amount of one step by which the pair of image signals are relatively shifted in the shift processing in a case where the starlit sky image capture mode is selected by the switching is smaller than a shift amount of one step by which the pair of image signals are relatively shifted in a case where the normal image capture mode is selected.

Further features of the present invention will become apparent from the following description of exemplary embodiments with reference to the attached drawings.

DESCRIPTION OF THE EMBODIMENTS

Hereinafter, embodiments of the present invention will be described below in detail with reference to the accompanying drawings.

First Embodiment

Figure 1:
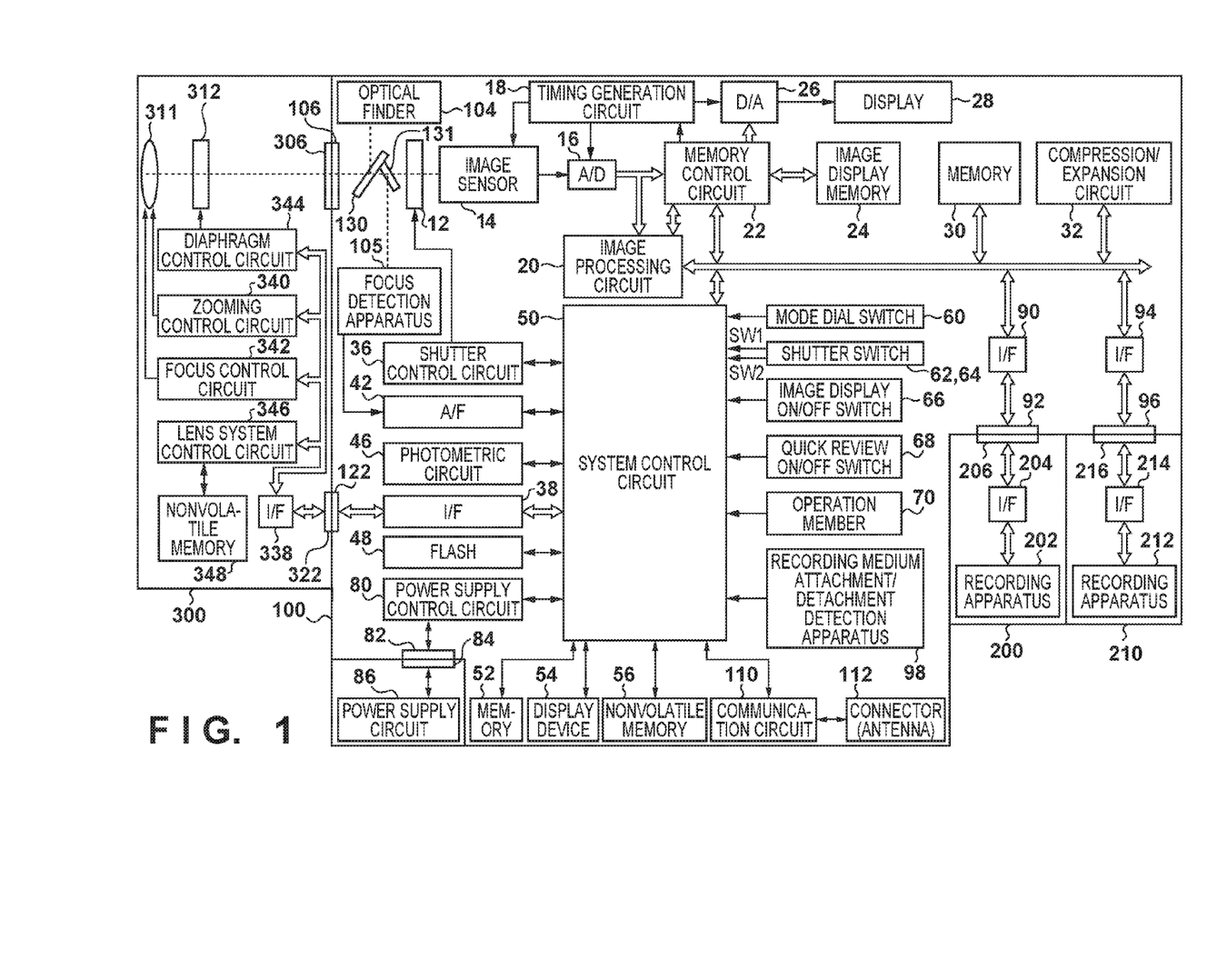
FIG. 1 is a diagram showing a configuration of an image capturing apparatus that has a focus adjustment apparatus.

FIG. 1 is a diagram showing the configuration of an image capturing apparatus that has a focus adjustment apparatus, that is to say, a camera system that includes a camera in which a plurality of image capture lenses can be replaced and the image capture lenses. In FIG. 1, the camera system that includes the focus adjustment apparatus of this embodiment is constituted by including a camera 100 and an image capture lens 300 that is mounted thereto in a replaceable manner. First, the configuration of the camera 100 will be described.

The camera 100 is adapted for a camera system that includes a plurality of types of image capture lenses 300, and lenses that are of the same type but have different manufacturing numbers can be mounted. Furthermore, the camera 100 is configured such that image capture lenses 300 having different local distances and maximum aperture f numbers, an image capture lens 300 having a zooming function and the like can also be mounted, and the image capture lenses are replaceable regardless of whether the types thereof are the same or different.

In this camera 100, light flux that passed through the image capture lens 300 of this embodiment passes through a camera mount 106, is reflected upward by a main mirror 130, and is incident on an optical finder 104. The optical finder 104 allows a photographer to perform image capture while observing the subject as an optical image. The optical finder 104 is provided with some of the functions of a display unit 54, such as focusing display, camera shake warning display, aperture value display and exposure correction display.

The main mirror 130 is constituted by a semitransmissive half mirror, and a portion of light flux that is incident on the main mirror 130 passes through this half mirror part, is reflected downward by a sub mirror 131, and is incident on a focus detection apparatus 105. The focus detection apparatus 105 adopts a phase difference detection AF mechanism including a secondary image forming optical system, converts the obtained optical image into electrical signals, and transmits the electrical signals to an AF circuit (autofocus circuit) 42. In the AF circuit 42, phase difference detection calculation is performed using these electrical signals. Based on this calculation result, a system control circuit 50 performs control such as focus adjustment processing on a focus control circuit 342 (to be described later) of the image capture lens 300 of this embodiment. In this embodiment, correction of a focus detection result is also performed by the AF circuit 42.

On the other hand, in the case of performing still image capture, electronic finder display or moving image capture when focus adjustment processing of the image capture lens 300 of this embodiment ends, a quick return mechanism (not illustrated) causes the main mirror 130 and the sub mirror 131 to retreat out of image capture light flux. Accordingly, the light flux that passed through the image capture lens 300 is incident, via a shutter 12 for controlling the exposure amount, on an image sensor 14 that converts an optical image into electrical signals. After these image capture operations end, the main mirror 130 and the sub mirror 131 return to the positions as illustrated.

The electrical signals obtained by photoelectrical conversion in the image sensor 14 are sent to an A/D converter 16, and analog signal output is converted into digital signals (image data). Reference numeral 18 denotes a timing generation circuit that supplies clock signals and control signals to the image sensor 14, the A/D converter 16 and a D/A converter 26, and that is controlled by a memory control circuit 22 and the system control circuit 50. The image processing circuit 20 performs predetermined pixel interpolation processing and color conversion processing on the image data from the A/D converter 16 or image data from the memory control circuit 22. The image processing circuit 20 performs predetermined calculation processing using the image data.

The image sensor 14 has a portion of the focus detection apparatus, and even in the state where the main mirror 130 and the sub mirror 131 are caused to retreat out of the image capture light flux by the quick return mechanism, can perform phase difference detection AF. Among the obtained image data pieces, image data pieces corresponding to focus detection are converted into focus detection signals by the image processing circuit 20. After that, the focus detection signals are sent to the AF circuit 42 via the system control circuit 50, and the focus adjustment apparatus performs focusing of the image capture lens 300. Note that a configuration is adopted in which so-called contrast AF is also possible in which the system control circuit 50 causes the focus control circuit 342 to perform focusing of the image capture lens 300 based on a result of calculation performed on image data of the image sensor 14 using the image processing circuit 20. Accordingly, during electronic finder observation and moving image capture, the main mirror 130 and the sub mirror 131 retreat out of the image capture light flux, but both phase difference detection AF and contrast AF by the image sensor 14 are possible. In particular, because phase difference detection AF is possible, high-speed focusing is possible.

In this manner, the camera 100 of this embodiment uses phase difference detection AF by the focus detection apparatus 105 in normal still image capture during which the main mirror 130 and the sub mirror 131 are in the image capture optical path. In addition, a configuration is adopted in which during electronic finder observation and moving image capture during which the main mirror 130 and the sub mirror 131 retreat out of the image capture light flux, phase difference detection AF by the image sensor 14 is used. Therefore, focus adjustment is possible in all image capture, namely still image capture, electronic finder and moving image capture. Note that a configuration may also be adopted in which both image capturing plane phase difference detection AF and contrast AF are used as AF by the image sensor 14.

The memory control circuit 22 controls the A/D converter 16, the timing generation circuit 18, the image processing circuit 20, an image display memory 24, the D/A converter 26, a memory 30 and a compression/expansion circuit 32. Data from the A/D converter 16 is written to the image display memory 24 or the memory 30 via the image processing circuit 20 and the memory control circuit 22, or data from the A/D converter 16 is written to the image display memory 24 or the memory 30 directly via the memory control circuit 22. A display 28 is constituted by a liquid crystal monitor or the like, and image data to be displayed that is written in the image display memory 24 is displayed by the display 28 via the D/A converter 26. By sequentially displaying captured image data using the display 28, an electronic finder function can be realized. The display 28 can arbitrarily turn on/off its display in accordance with an instruction from the system control circuit 50, and in the case where the display is turned off, electrical power consumption by the camera 100 can be significantly reduced.

Moreover, the memory 30 is a memory for storing captured still images and moving images, and has a storage capacity sufficient for storing a predetermined number of still images and moving images of a predetermined time. Accordingly, even in the case of consecutive image capture or panoramic image capture, a large amount of images can be written into the memory 30 at a high speed. The memory 30 can also be used as a work area of the system control circuit 50. The compression/expansion circuit 32 has a function of compressing/expanding image data by adaptive discrete cosine transformation (ADCT) or the like, reads images stored in the memory 30 and performs compression processing or expansion processing, and writes the image data that underwent the processing to the memory 30.

A shutter control circuit 36 controls the shutter 12 based on photometry information from a photometric circuit 46 in cooperation with a diaphragm control circuit 344 that controls a diaphragm 312 on the image capture lens 300 side. An interface circuit 36 and a connector 122 electrically connect the camera 100 and the image capture lens 300. These also have a function of exchanging control signals, state signals, data signals and the like between the camera 100 and the image capture lens 300, and supplying currents of various voltages. A configuration may also be adopted in which not only electrical communication but also optical communication, sound communication and the like are performed. The photometric circuit 46 performs AE processing. Light flux that passed through the image capture lens 300 is made incident on the photometric circuit 46 via the camera mount 106, the mirror 130, and a photometric lens (not illustrated), and thereby it becomes possible to measure an exposure state of the image. The photometric circuit 46 also has a function of light adjustment processing by cooperating with a flash 48. Note that based on a calculation result of performing calculation on image data from the image sensor 14 by the image processing circuit 20, the system control circuit 50 can also perform AE control on the shutter control circuit 36 and the diaphragm control circuit 344 of the image capture lens 300. The flash 48 also has a function of projecting AF auxiliary light and a function of adjusting flash light.

The system control circuit 50 performs overall control of the camera 100, and a memory 52 stores constants, variables, programs and the like for operation of the system control circuit 50. The display device 54 is a liquid crystal display device that displays an operation state, messages and the like using characters, images, sound and the like in accordance with execution of a program by the system control circuit 50. One or more display devices 54 are installed at positions that are near the operation members of the camera 100 and at which it is easy to visually recognize the display devices 54, and are constituted by a combination of an LCD, an LED and the like. Among display content of the display device 54, display content to be displayed on an LCD or the like include information regarding the number of captured images such as the number of recorded images and the remaining number of images that can be captured, information regarding an image capture condition such as a shutter speed, an aperture value, exposure correction and flash, and the like. In addition, the battery remaining capacity, the date and time and the like are also displayed. In addition, a portion of the functions of the display device 54 are provided within the optical finder 104 as described above.

A nonvolatile memory 56 is an electrically erasable and recordable memory, and an EEPROM or the like is used as the nonvolatile memory 56. Reference numerals 60, 62, 64, 66, 68 and 70 denote operation members for inputting various operation instructions to the system control circuit 50, and are constituted by combinations of one or more switches, dials, touch panels, apparatuses that perform pointing by sight line detection, sound recognition apparatuses or the like.

A mode dial switch 60 can perform switching and setting of function modes such as a starlit sky image capture mode of this embodiment, power supply off, an automatic image capture mode, a manual image capture mode, a playback mode and a PC connection mode. A shutter switch SW1 62 is turned on when a shutter button (not illustrated) is half-pressed, and instructs the start of AF processing, AE processing, AWB processing, EF processing and the like. A shutter switch SW2 64 is turned on when the shutter button is fully pressed, and instructs the start of a series of processes related to image capture. The processes related to image capture include exposure processing, developing processing, recording processing and the like. In exposure processing, signals read out from the image sensor 14 are written as image data to the memory 30 via the A/D converter 16 and the memory control circuit 22. In developing processing, development using calculation in the image processing circuit 20 and the memory control circuit 22 is performed. In recording processing, image data is read out from the memory 30, is compressed by the compression/expansion circuit 32, and is written as image data to a recording medium 200 or 210.

An image display ON/OFF switch 66 can set an ON/OFF state of the display 28. This function enables electrical power saving by shutting off a current supply to a display that is constituted by a liquid crystal monitor or the like, when performing image capture using the optical finder 104.

A quick review ON/OFF switch 68 sets a quick review function for automatically reproducing captured image data Immediately after the image capture. An operation member 70 is constituted by various buttons, a touch panel and the like. The various buttons include a menu button, a flash setting button, a button for switching between single shooting/consecutive shooting/self-timer, an exposure correction button and the like.

A power supply control circuit 80 is constituted by a battery detection circuit, a DC/DC convertor, a switch circuit for switching a block to be energized and the like. The presence or absence of a mounted battery, a battery type, and a battery remaining capacity are detected, the DC/DC convertor is controlled based on the detection result and an instruction from the system control circuit 50, and a necessary voltage is supplied to various constituent elements including a recording medium for a necessary time period. Connectors 82 and 84 connect a power supply circuit 86 constituted by a primary battery such as an alkaline battery or a lithium battery, a secondary battery such as an NiCd battery, an NiMH battery or a lithium ion battery, an AC adapter or the like to the camera 100.

Interfaces 90 and 94 have a function of connecting to recording media such as a memory card or a hard disk, and connectors 92 and 96 physically connect to the recording media such as a memory card or a hard disk. A recording medium attachment/detachment detection apparatus 98 detects whether or not a recording medium is mounted to the connector 92 or 96. Note that in this embodiment, description is given assuming that two types of interfaces and connectors for mounting recording media are included, but a configuration including one or more, namely any number of types of interfaces and connectors may be adopted. Moreover, a configuration may be adopted in which a combination of interfaces and connectors that have different standards is included. Furthermore, by connecting various communication cards such as a LAN card to such an interface and connector, the camera and another peripheral device such as a computer or a printer can transfer image data and management information accompanying the image data to each other.

A communication circuit 110 has various communication functions such as wired communication and wireless communication. A connector 112 connects the camera 100 to another device using the communication circuit 110, and is an antenna in the case of wireless communication. The recording media 200 and 210 are memory cards, hard disks or the like. The recording media 200 and 210 have recording apparatuses 202 and 212 constituted by a semiconductor memory, a magnetic disk or the like, interfaces 204 and 214 for communication with the camera 100, and connectors 206 and 216 for connecting to the camera 100.

Next, the image capture lens 300 of this embodiment will be described. The image capture lens 300 is configured to be removable from the camera 100. A lens mount 306 mechanically couples the image capture lens 300 to the camera 100, and is mounted to the camera 100 via the camera mount 106 in a replaceable manner. The camera mount 106 and the lens mount 306 include the functions of the connector 122 and a connector 322 that electrically connect the image capture lens 300 to the camera 100. A lens 311 includes a focus lens for focusing on a subject, and the diaphragm 312 is a diaphragm for controlling the light amount of image capture light flux. The greater the aperture value is, the more the diaphragm restricts incident light flux, and the smaller the aperture value is, the more incident light flux is taken in.

The connector 322 and an interface 338 electrically connect the image capture lens 300 to the connector 122 of the camera 100. The connector 322 then allows the camera 100 and the image capture lens 300 to exchange control signals, state signals, data signals and the like, and has a function of allowing currents of various voltages to be supplied. The connector 322 may be configured to perform not only electrical communication but also optical communication, sound communication and the like. A zooming control circuit 340 controls zooming of the lens 311, and the focus control circuit 342 controls the operations of the focus lens of the lens 311. If the image capture lens 300 is of a single focus lens type without a zooming function, the zooming control circuit 340 is not required. The diaphragm control circuit 344 controls the diaphragm 312 based on photometry information from the photometric circuit 46, in cooperation with the shutter control circuit 36 that controls the shutter 12. The diaphragm control circuit 344 and the diaphragm 312 adjust the diaphragm opening.

A lens system control circuit 346 performs overall control of the image capture lens 300. Also, the lens system control circuit 346 has a function of a memory for storing constants, variables, programs and the like for operation of the image capture lens. A nonvolatile memory 348 stores identification information such as a number unique to each image capture lens, management information, function information such as an open aperture value, a minimum aperture value and a focal distance, current and past setting values, and the like. In this embodiment, lens frame information that is based on the state of the image capture lens 300 is also stored. This lens frame information is information regarding the distance between the image sensor 14 and the frame opening for determining light flux that passes through the image capture lens and the radius of the frame opening. The diaphragm 312 serves as a frame for determining light flux that passes through the image capture lens, and other than that, the opening of a lens frame component that holds a lens or the like serve as the frame. In addition, the frame for determining light flux that passes through the image capture lens varies depending on the focus position and the zooming position of the lens 311, and thus a plurality of frames are prepared in correspondence with the focus positions and the zooming positions of the lens 311. A configuration is adopted in which, when the camera 100 performs focus detection using the focus detection apparatus of this embodiment, optimum lens frame information that corresponds to the focus position and the zooming position of the lens 311 is selected, and is sent to the camera 100 through the connector 322.

A description was given above regarding the configuration of a camera system constituted by the camera 100 and the image capture lens 300. Next, the focus detection apparatus constituted by the image sensor 14 will be described in detail. This focus detection apparatus adopts phase difference detection AF similarly to the focus detection apparatus 105. The configuration of the focus detection apparatus will be described.

In this embodiment, two photoelectric conversion portions are provided for each of the pixels of the image sensor 14, and output signals of an A image and a B images (a pair of image signals) for AF (autofocus) can be obtained from all the pixels. The number of signals for AF is high, thus the S/N ratio of the output signals is good, and an accurate focus detection result can be obtained. Also, pixel signals for imaging are also obtained from pixels for focus detection, and thus a high quality image can be obtained.

Figure 2:
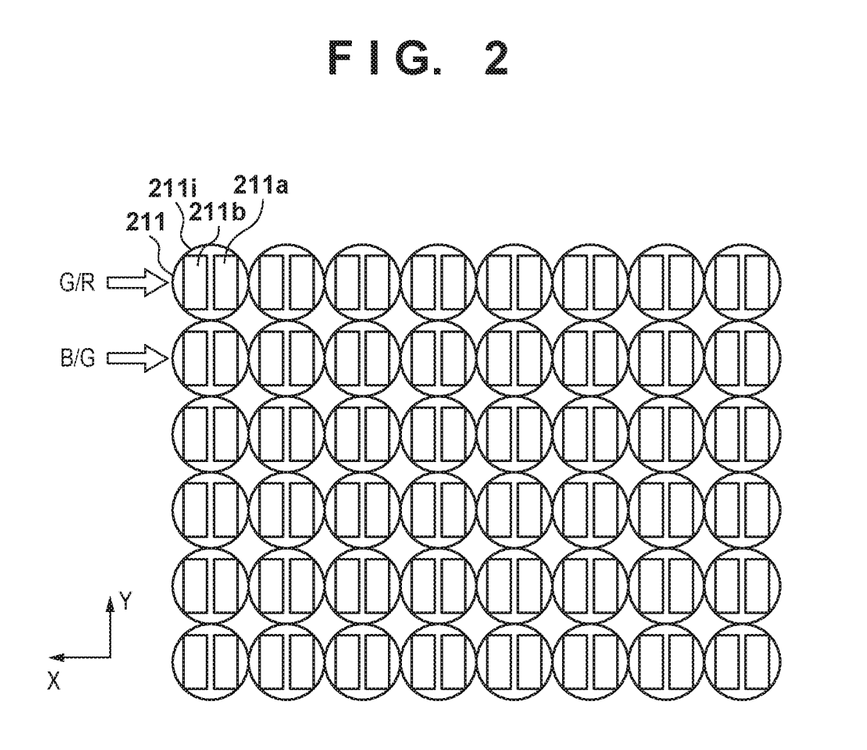
FIG. 2 is a diagram showing a pixel arrangement of an image sensor in a first embodiment.

FIG. 2 is a diagram showing the pixel arrangement of the image sensor in this embodiment, and shows a state in which the range of six rows vertically (a Y direction) and eight columns horizontally (an X direction) of a two-dimensional C-MOS area sensor is observed from the imaging optical system side. A Bayer array is applied to the color filter, and for pixels in odd-numbered rows, green color filters and red color filters are alternately arranged in this order from the left. For pixels in even-numbered rows, blue and green color filters are alternately arranged in this order from left. A circle 2111 indicates an on-chip microlens. Each of a plurality of rectangles arranged inside the on-chip microlens is a photoelectric conversion portion.

In this embodiment, a configuration is adopted in which each of the photoelectric conversion portions in all the pixels is divided into two in the X direction, and the photoelectric conversion signal of one of the two divided, areas and the sum of the two photoelectric conversion signals can be independently read out. By obtaining the difference between the sum of the two photoelectric conversion signals and the photoelectric conversion signal of one of the divided areas, a signal corresponding to the signal that is obtained in the other photoelectric conversion area can be obtained. Such photoelectric conversion signals of the divided areas are used for phase difference focus detection in a method to be described later, and in addition, enable a 3D (3-dimensional) image constituted by a plurality of images including parallax information to be generated. On the other hand, the sum of two photoelectric conversion signals is used as a normal captured image.

Here, pixel signals in the case of performing phase difference focus detection in this embodiment will be described. In this embodiment, using the microlens 211i shown in FIG. 2 and divided photoelectric conversion portions 211a and 211b, which serve as focus detection pixels, pupil division is performed on the exit pupil area of the imaging optical system. Among a plurality of the pixels 211 that are arranged in the same row and are in a predetermined range, combined and organized output of the photoelectric conversion portions 211a is taken as an A image for AF, and similarly, combined and organized output of the photoelectric conversion portions 211b is taken as a B image for AF.

By detecting a relative image deviation amount of the A image for AF and the B image for AF generated in this manner by phase difference calculation, it is possible to detect a focus deviation amount in a predetermined area, in other words, the defocus amount (Def). In this embodiment, one of the A image for AF and the B image for AF is not output from the image sensor, but as described above, the sum of the A image output and the B image output is output, and thus from the difference between the output of the sum and the output of the other, the signals of the other image can be obtained, making it possible to perform focus detection.

Figure 3:
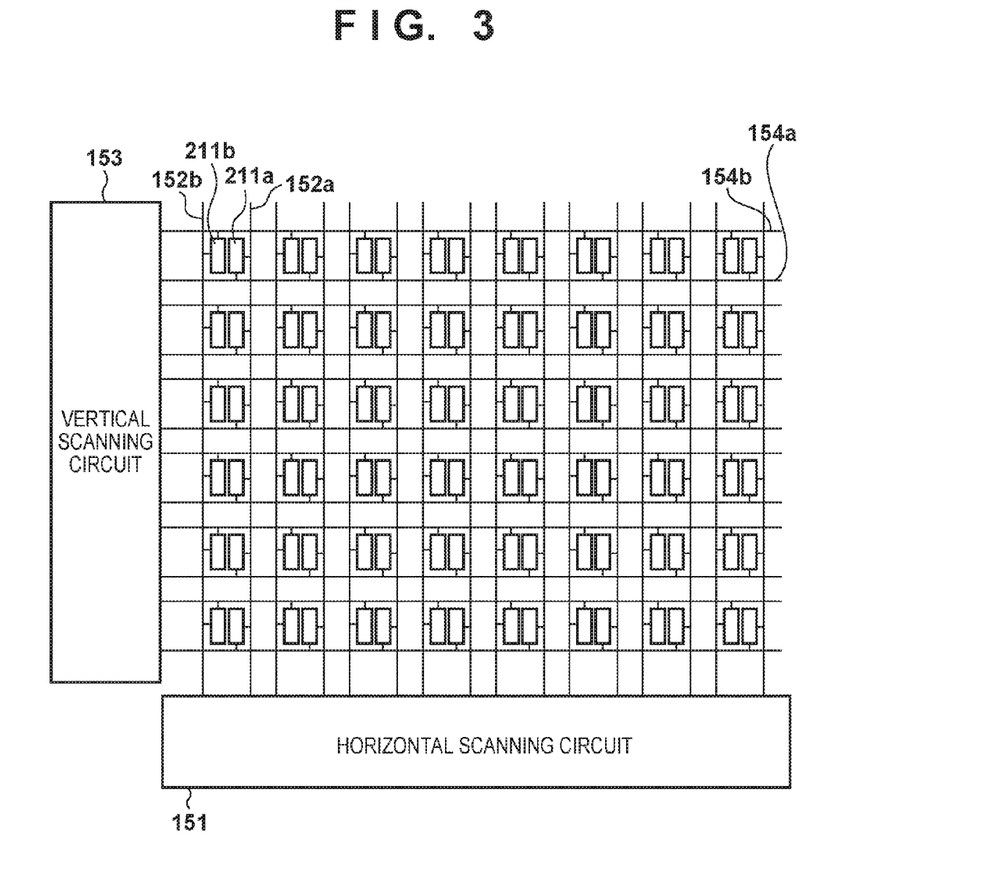
FIG. 3 is a diagram showing a configuration of a readout circuit in the image sensor in the first embodiment.

FIG. 3 is a diagram showing the configuration of a readout circuit in the image sensor of this embodiment. Reference numeral 151 denotes a horizontal scanning circuit, and reference numeral 153 denotes a vertical scanning circuit. Horizontal scanning lines 152a and 152b and vertical scanning lines 154a and 154b are arranged on the boundaries of the pixels, and signals of the photoelectric conversion portions are read out to the outside via these scanning lines. In the image sensor of this embodiment, assume that A image output signals for AF are read out from odd-numbered rows, and B image output signals for AF are read out from even-numbered rows. In order to improve the S/N ratios of the A image output signals for AF and the B image output signals for AF, a plurality of output signals are added in the row direction so as to respectively generate A image signals and B image signals. Alternatively, in order to reduce the processing load at a later stage, thinning is performed in the row direction, and the A image signals and the B image signals are respectively generated. Focus detection is performed using the A image signals and the B image signals generated in this manner.

Figure 4A:
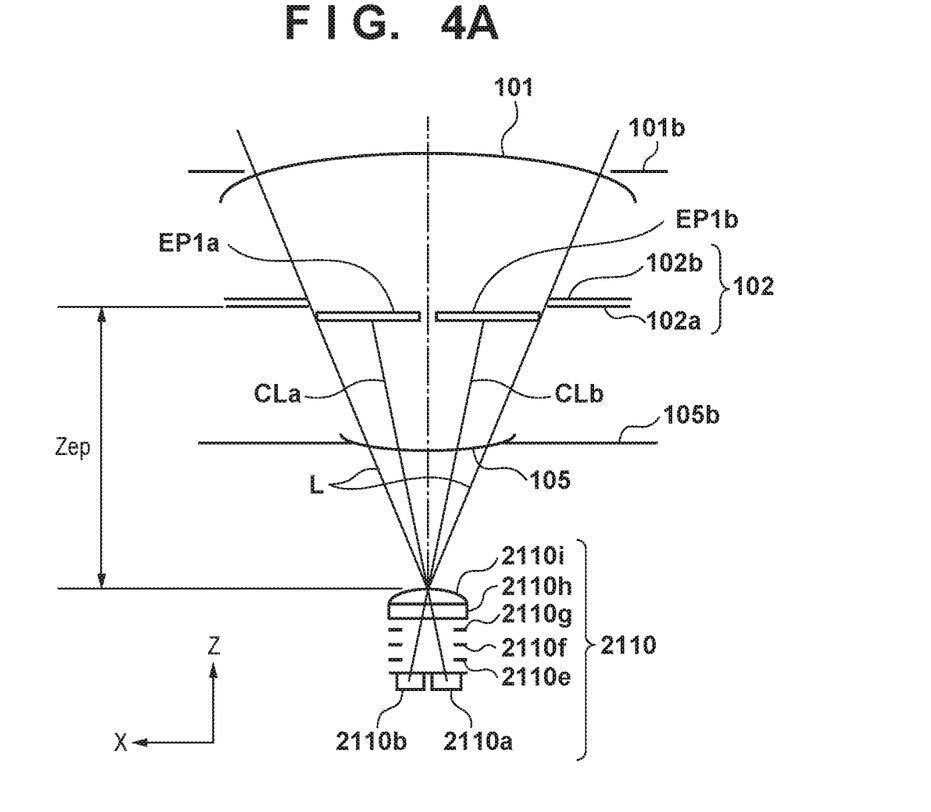
FIG. 4A is a diagram for describing a conjugate relationship between photoelectric conversion portions of the image sensor in the first embodiment.
Figure 4B:
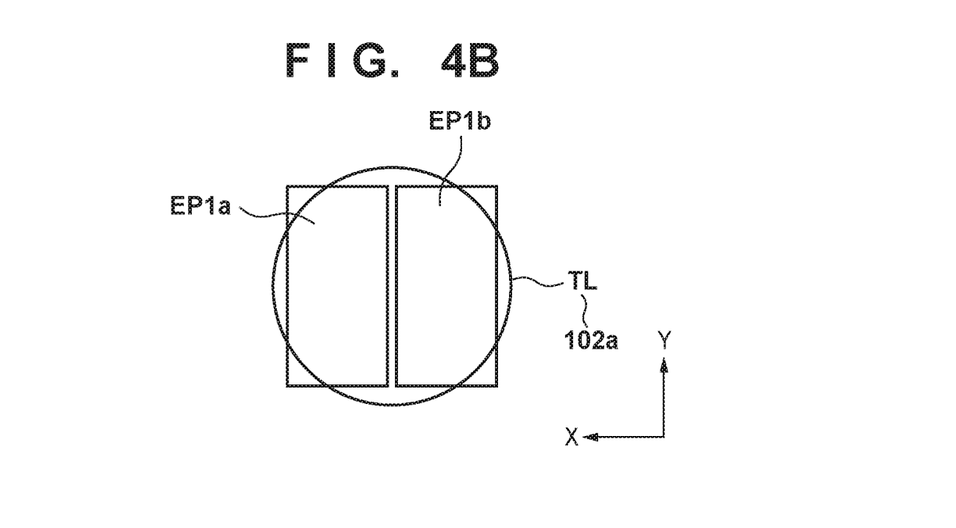
FIG. 4B is a diagram showing one pixel of the image sensor in the first embodiment.

However, in the starlit sky image capture mode in this embodiment, a star image that is to be the subject is extremely small. Therefore, the above-described addition of output signals results in the deterioration of the S/N ratio, and thinning results in a risk that a star image cannot be captured. In view of this, in this embodiment, without performing addition or thinning, the image processing circuit 20 generates the A image signals and the B image signals, which are focus detection signal, from the A image output signals and the B image output signals that have been read out FIGS. 4A and 4B are diagrams illustrating the conjugate relationship between the exit pupil plane of the imaging optical system and the photoelectric conversion portions of the image sensor that are arranged at an image height of zero, in other words, near the center of the image plane, in the image capturing apparatus of this embodiment. The photoelectric conversion portions in the image sensor and the exit pupil plane of the imaging optical system are designed to have a conjugate relationship due to the on-chip microlenses. Generally, the exit pupil of the imaging optical system substantially matches a plane on which an iris diaphragm for adjusting the light amount is placed. On the other hand, the imaging optical system of this embodiment is a zoom lens having a power varying function, but depending on the optical type, the distance from the image plane of the exit pupil and its size change, if a power varying operation is performed. The imaging optical system in FIG. 4A indicates a Middle state in which the focal distance is in the middle between the wide angle end and the telephoto-end. Assuming that this is a standard exit pupil distance Zep, optimum designing of eccentricity parameters based on the shape of the on-chip microlens and the image height (X, Y coordinates) is carried out.

In FIG. 4A, reference numeral 101 denotes a first lens group, reference numeral 101b denotes a lens barrel member that holds the first lens group, reference numeral 105 denotes a third lens group and reference numeral 105b denotes a lens barrel member that holds the third lens group. Reference numeral 102 denotes a diaphragm, reference numeral 102a denotes an opening plate for defining the opening diameter when the diaphragm is opened, and reference numeral 102b denotes a diaphragm blade for adjusting the opening diameter when performing diaphragming. Note that reference numerals 101b, 102a, 102b and 105b denote members that act as restriction members for light flux that passes through the imaging optical system and that show an optical virtual image when observed from the image plane. In addition, a synthetic aperture near a diaphragm 102 is defined as the exit pupil of the lens, and as described above, the distance from the image plane is denoted by Zep.

Reference numeral 2110 denotes a pixel for photoelectrically converting a subject image, which is arranged near the center of the image plane and is called a central pixel in this embodiment. The central pixel 2110 is constituted by members such as photoelectric conversion portions 2110a and 2110b, wiring layers 2110e to 2110g, a color filter 2110h and an on-chip microlens 2110i in this order from its lowermost layer. The two photoelectric conversion portions are projected on the exit pupil plane of the imaging optical system by the on-chip microlens 2110i. In other words, the exit pupil of the imaging optical system will be projected on the surfaces of the photoelectric conversion portions via the on-chip microlens 2110.

FIG. 4B shows projected images of photoelectric conversion portions on the exit pupil plane of the imaging optical system, and the projected images of the photoelectric conversion portions 2110a and 2110b respectively correspond to projected images EP1a and EP1b. Moreover, in this embodiment, the image sensor has pixels that can obtain the output of one of the two photoelectric conversion portions 2110a and 2110b, and the output of the sum of the two photoelectric conversion portions. The output of the sum of the two photoelectric conversion portions is obtained by photoelectrically converting light flux that passed through both the areas of the projected images EP1a and EP1b that represent the substantially entire pupil area of the imaging optical system. The projected image EP1a is called a first pupil area, the projected image EP1b is called a second pupil area, and the area of the sum of the two projected images is called a third pupil area.

In FIG. 4A, the outermost portion of the light flux that passes through the imaging optical system is denoted by L, the light flux L is restricted by an opening plate 102a of the diaphragm, and the projected images EP1a and EP1b have substantially no vignetting occurring in the imaging optical system. In FIG. 4B, the light flux L in FIG. 4A is denoted by TL. From the fact that large portions of the projected images EP1a and EP1b of the photoelectric conversion portions are included within the circle denoted by TL, it is seen that substantially no vignetting has occurred. The light flux L is restricted only by the opening plate 102a of the diaphragm, and thus TL can also be called 102a. At this time, in the center of the image plane, vignetting states of the projected images EP1a and EP1b are symmetrical with respect to the optical axis, and the amounts of light received by the photoelectric conversion portions 2110a and 2110b are the same.

As described above with reference to FIGS. 2 to 4B, the image sensor 14 has not only a function of imaging, but also a function as a focus detection apparatus. Moreover, as a focus detection method, pixels for focus detection that receive light flux obtained with a divided exit pupil are included, and thus phase difference detection AF can be performed. By having such a configuration, in this embodiment, phase difference detection can be performed using focus detection signals from the image sensor 14.

Figure 5:
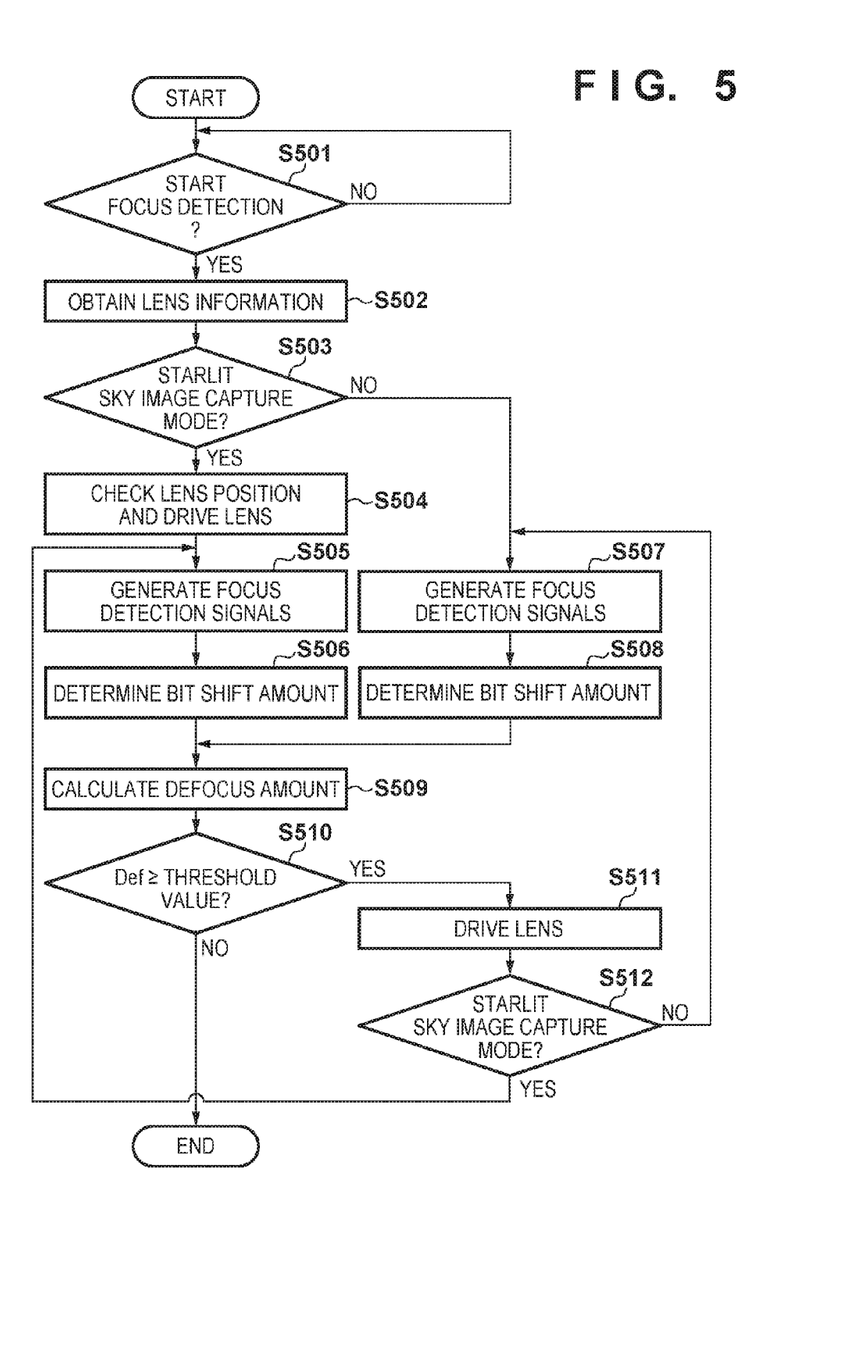
FIG. 5 is a flowchart showing a focus adjustment operation of the first embodiment.

Next, the operations of the camera 100 in this embodiment will be described. FIG. 5 is a flowchart showing a focus adjustment operation that is executed by the system control circuit 50. Note that this flowchart snows a focus adjustment operation during electronic finder or moving image capture during which the main mirror 130 and the sub mirror 131 retreat out of image capture light flux, and phase difference detection AF is performed by the image sensor 14. In other words, while display for electronic finder and moving image recording are performed, the focus adjustment operation is performed in parallel.

First, in step S501, it is detected whether or not the start of a focus detection operation has been instructed by turning on the shutter switch SW1 (62), operating the operation member 70 or the like, and in the case where the start of the focus detection operation has been instructed, the procedure advances to step S502. Here, the presence and absence of the instruction for the start of the focus detection operation are distinguished, but focus detection may be started using a transition to electronic finder display or moving image recording as a trigger.

In step S502, the above-described lens frame information of the image capture lens 300 and various types of lens information such a focus lens position are obtained via the interface circuits 38 and 338 and the connectors 122 and 322. In step S503, it is determined whether or not a switch has been made to the starlit sky image capture mode, and if a switch has been made to the starlit sky image capture mode, the procedure advances to step S504. If a switch has not been made to the starlit sky image capture mode (in the case of a normal image capture mode), the procedure advances to step S507. Note that a switch to the starlit sky image capture mode is made by using the mode dial switch 60.

Step S504 is performed in the case where it is determined in step S503 that a switch has been made to the starlit sky image capture mode. In step S504, first, the lens position obtained in step S502 is checked. In the case where the checked lens position is not at a setting reference position, which is a designed infinite distance position that was adjusted in a manufacturing process, the focus lens of the lens 311 is moved to the setting reference position by the focus control circuit 342, and the procedure advances to step S505. In the case where the checked lens is located near the setting reference position, lens driving is not performed, and the procedure advances to step S505.

In step S505, filter processing is performed on image data sequentially read out from the image sensor 14 using the image processing circuit 20, and focus detection signals are generated. After the generation, the procedure advances to step S506. The filter used for the filter processing at this time will be described. The focus lens was driven, in step S504, to the vicinity of the setting reference position at which the infinite distance at which the star image exists is focused on, and thus focus detection in a slightly defocused state will be performed in step S505. Therefore, a signal pass band for the filter processing needs to include a higher frequency band than usual. These focus detection signals are then sent to the AF circuit 42, and undergo light amount correction and the like.

In step S506, a bit shift amount between the A image for AF and the B image for AF used for calculating a defocus amount in step S509 to be described later is determined. The bit shift amount means a deviation amount for one step in the case of shifting the A image and the B image one step at a time and detecting the deviation amount, in other words, resolution for detecting the deviation amount. It is assumed that the bit shift amount at the time of calculating the defocus amount (Def) in the starlit sky image capture mode is a second bit shift amount that is smaller than a first bit shift amount that is a bit shift amount for a case other than the starlit sky image capture mode. In the case where the focus lens is located near the setting reference position at which the star image is focused on, focus detection in a slightly defocused state will be performed. Therefore, the total shift amount of the A image and the B image does not need to be large, and thus focus detection accuracy can be improved by reducing the bit shift amount that serves as the resolution. After the bit shift amount is determined, the procedure advances to step S509.

In step S507, adding, thinning or the like is performed on image data that is sequentially read out using the image processing circuit 20, filter processing is further performed, and focus detection signals are generated. In this case, it is conceivable to perform focus detection in a largely defocused state, and thus a signal pass band for the filter processing needs to include a low frequency band. When performing focus adjustment from a largely defocused state to a slightly defocused state, adjustment may be performed as necessary such that the pass band for the filter processing becomes a higher frequency band in accordance with the defocused state. These focus detection signals are then sent to the AF circuit 42, and undergo light amount correction and the like.

In step S508, the bit shift amount between the A image for AF and the B image for AF used for calculating a defocus amount in step S509 to be described later is determined. Assume that the bit shift amount at the time of calculating the defocus amount (Def) in this case is the first bit shift amount that is a bit shift amount for a case other than the starlit sky image capture mode. As described already, this first bit shift amount is greater than the second bit shift amount in the case of the starlit sky image capture mode. After the bit shift amount is determined, the procedure advances to step S509.

In step S509, shift processing is performed based on the bit shift amount determined in step S506 or step S508, and a phase difference indicating the deviation amount between the A image and the B image is calculated using a known phase difference calculation method in the AF circuit 42, and is converted into the defocus amount (Def).

Here, focus detection calculation in this embodiment will be described in detail. First, phase difference calculation using the A image for AF and the B image for AF, which correspond to focus detection signals, is performed. A phase difference COR (k) used for phase difference calculation is calculated by the following expression.

$$COR(k) = \sum_{i=1}^{N-1-2 \times kmax} |A(m,i-k) - B(m,i+k)| \quad (-kmax \leq k \leq kmax) \quad \text{(Expression 1)}$$

k used in Expression 1 is the number of steps when shifting the A image for AF and the B image for AF in order to detect a phase difference, and is an integer that is greater than or equal to −kmax and is less than or equal to kmax. The value k in the case where the A image for AF and the B image for AF match at the highest matching degree, namely in the case where the phase difference COR becomes minimum is obtained. Here, if the value k is calculated as an integer, the resolution decreases, and thus interpolation processing is appropriately performed and so-called sub-pixel calculation is performed.

In this embodiment, the difference of the phase difference COR is obtained, and a shift amount dk at which the sign of the difference amount changes is detected. A difference DCOR of the phase difference is calculated by the following expression.

$$DCOR(k) = COR(k) - COR(k-1) \quad \text{(Expression 2)}$$

Using this difference DCOR of the phase difference COR, the shift amount dk at which the sign of the difference amount changes is detected. The shift amount dk at which the sign of this difference amount changes serves as the phase difference. Letting the value k immediately before the sign changes be k1, and the value k immediately after the sign changes be k2 (k2=k1+1), the shift amount dk is calculated by the following expression.

$$dk = k1 + |DCOR(k1)|/|DCOR(k1) - DCOR(k2)| \quad \text{(Expression 3)}$$

In this manner, the shift amount dk between the A image for AF and the B image for AF, which is one pixel or less, is calculated, and the processing is ended. As the above-described phase difference calculation method, there are various known methods, and in this embodiment, another method may be used.

Next, the defocus amount (Def) is calculated. By multiplying the calculated shift amount by a sensitivity stored in the nonvolatile memory 56 in advance, the shift amount is converted into the defocus amount (Def). In this manner, the defocus amount (Def) is calculated.

Returning to the description given with reference to FIG. 5, in step S510, it is determined whether or not the defocus amount (Def) calculated in step S509 is greater than or equal to a predetermined threshold value. First, in the case where the defocus amount (Def) is greater than or equal to the threshold value, the procedure advances to step S511. In step S511, based on the defocus amount (Def) calculated in step S509, a lens driving amount of the image capture lens 300 is calculated. The lens driving amount is then sent to the focus control circuit 342 of the image capture lens 300 via the interface circuits 38 and 338 and the connector 122 and 322 so as to drive the focus lens, thereby performing focus adjustment of the image capture lens 300. The procedure is then advanced to step S512.

In step S512, it is determined whether or not the starlit sky image capture mode is selected, and in the case of the starlit sky image capture mode, the procedure returns to step S505. In a case other than the starlit sky image capture mode, the procedure returns to step S507. Moreover, in step S510, in the case where the defocus amount (Def) is smaller than the threshold value, lens driving is ended and the focus adjustment operation is ended.

The above-described configuration enables high-speed and accurate focus detection in image capturing plane phase difference AF, due to the settings suitable for starlit sky image capture.

Second Embodiment

Figure 6:
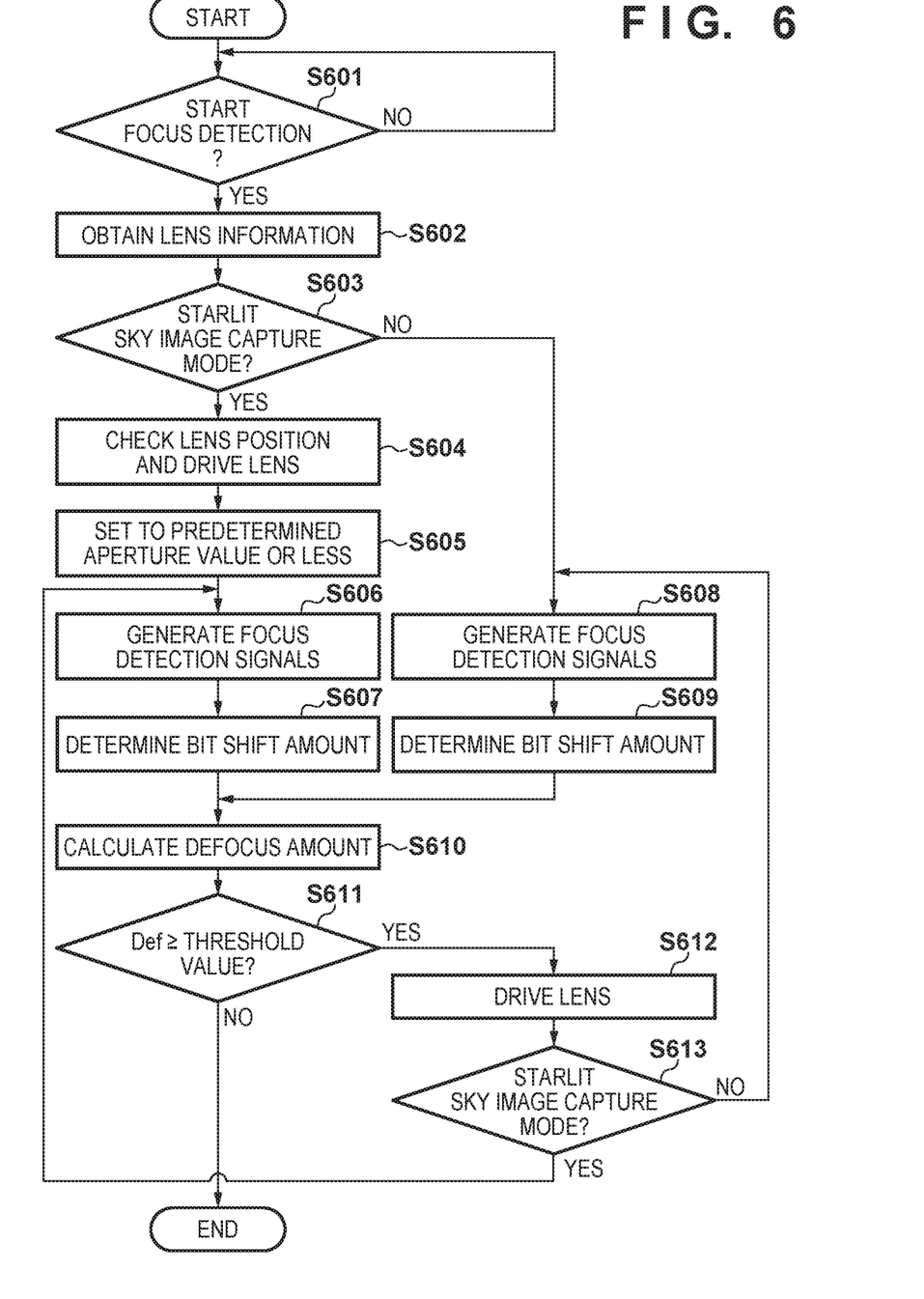
FIG. 6 is a flowchart showing a focus adjustment operation of a second embodiment.

A second embodiment of the present invention will be described below with reference to FIG. 6. In the second embodiment, in the case where the starlit sky image capture mode is selected, the aperture value is further controlled, and setting suitable for starlit sky image capture is automatically performed. In the first embodiment, in the case where the starlit sky image capture mode is selected, focus detection signals are generated from image data without performing adding or thinning. Moreover, in the case of the starlit sky image capture mode, a bit shift amount in the case of calculating a phase difference is set to a second bit shift amount that is smaller than the first bit shift amount for a case other than the starlit sky image capture mode. Accordingly, focus adjustment that is always high-speed and accurate can be performed on a star image that exists at an infinite distance that is the setting reference position of the focus lens. On the other hand, in the second embodiment, in the case where the starlit sky image capture mode is selected, in addition to the content of the first embodiment, the aperture value is reduced to be smaller than a predetermined aperture value (diaphragm is opened). By reducing the aperture value, more light flux that is incident from an extremely small subject such as a star image can be taken in.

Note that regarding the block diagram (FIG. 1) of the image capturing apparatus in the first embodiment and the diagrams (FIGS. 2 to 4B) illustrating the focus detection apparatus constituted by the image sensor 14, the configuration in the second embodiment is similar, and similar operations are performed, thereby omitting description thereof.

The operations of the camera 100 in the second embodiment will be described. FIG. 6 is a flowchart showing a focus adjustment operation that is executed by the system control circuit 50. The processes of steps S601 to S604 are similar to the processes of steps S501 to S504 in the flowchart of the first embodiment (FIG. 5), and thus the description thereof is omitted.

In step S605, in the case where it is determined in step S603 that a switch has been made to the starlit sky image capture mode, the aperture value when obtaining focus detection signals is set to a predetermined aperture value or less (the opening of the diaphragm is opened to a predetermined value or more). Accordingly, more light flux that is incident from an extremely small subject such as a star image can be taken in. The procedure then advances to focus detection signal acquisition in step S606, processing similar to that of the first embodiment is subsequently performed, and the focus adjustment operation is ended.

Moreover, the processes in steps S608 and S609 are processing in the case where it is determined in step S603 that a switch has not been made to the starlit sky image capture mode, which is similar to the processes in steps S507 and S508 in the flowchart (FIG. 5) of the first embodiment, and thus the description is omitted.

The above configuration enables high-speed and accurate focus detection in image capturing plane phase difference AF, due to the settings suitable for starlit sky image capture.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166182, filed Aug. 25, 2015, which is hereby incorporated by reference herein in its entirety.

What is claimed is:

1. An image capturing apparatus comprising:
   an image sensor having a pair of focus detection pixels that each receive light that passed through different exit pupil areas of an imaging optical system;
   a detection unit configured to perform, on a pair of image signals that were obtained from each of the focus detection pixels and respectively correspond to the different exit pupil areas, shift processing for relatively shifting the pair of image signals, and detect a phase difference of the pair of image signals;
   a switching unit configured to switch between a starlit sky image capture mode for performing image capture of a starlit sky and a normal image capture mode for performing normal image capture; and
   a control unit configured to perform control such that a shift amount of one step by which the pair of image signals are relatively shifted in the shift processing in a case where the starlit sky image capture mode is selected by the switching unit is smaller than a shift amount of one step by which the pair of image signals are relatively shifted in a case where the normal image capture mode is selected.

2. The image capturing apparatus according to claim 1, further comprising:
   a driving unit configured to drive a focus lens arranged in the imaging optical system,
   wherein the driving unit drives the focus lens to a predetermined reference position in a case where the starlit sky image capture mode is selected by the switching unit.

3. The image capturing apparatus according to claim 2, wherein
   the predetermined reference position is a position of the focus lens set by design for bringing an infinite distance of the imaging optical system in focus.

4. The image capturing apparatus according to claim 3, wherein
   the position of the focus lens set by design for bringing the infinite distance of the imaging optical system in focus has been adjusted in a manufacturing process of the image capturing apparatus.

5. The image capturing apparatus according to claim 1, further comprising:
   an addition unit configured to add signals of a plurality of the focus detection pixels in a direction in which each of the focus detection pixels has been divided into a plurality of sections so as to receive light that passed through different exit pupil areas of the imaging optical system.

6. The image capturing apparatus according to claim 5, wherein
   in the normal image capture mode, the addition unit adds the signals of the focus detection pixels in the direction of the division.

7. The image capturing apparatus according to claim 6, wherein
   the addition unit does not add the signals of the focus detection pixels in the starlit sky image capture mode.

8. The image capturing apparatus according to claim 1, wherein
   in a case where the starlit sky image capture mode is selected by the switching unit, the control unit reduces an aperture value of a diaphragm arranged in the imaging optical system to be smaller than a predetermined aperture value.

9. A control method for an image capturing apparatus including an image sensor having a pair of focus detection pixels that each receive light that passed through different exit pupil areas of an imaging optical system, the method comprising:
  performing, on a pair of image signals that were obtained from each of the focus detection pixels and respectively correspond to the different exit pupil areas, shift processing for relatively shifting the pair of image signals, and detecting a phase difference of the pair of image signals;
  switching between a starlit sky image capture mode for performing image capture of a starlit sky and a normal image capture mode for performing normal image capture; and
  performing control such that a shift amount of one step by which the pair of image signals are relatively shifted in the shift processing in a case where the starlit sky image capture mode is selected by the switching is smaller than a shift amount of one step by which the pair of image signals are relatively shifted in a case where the normal image capture mode is selected.

10. A non-transitory computer-readable storage medium that stores a program for causing a computer to execute steps of a control method for an image capturing apparatus including an image sensor having a pair of focus detection pixels that each receive light that passed through different exit pupil areas of an imaging optical system, the control method comprising: performing, on a pair of image signals that were obtained from each of the focus detection pixels and respectively correspond to the different exit pupil areas, shift processing for relatively shifting the pair of image signals, and detecting a phase difference of the pair of image signals; switching between a starlit sky image capture mode for performing image capture of a starlit sky and a normal image capture mode for performing normal image capture; and performing control such that a shift amount of one step by which the pair of image signals are relatively shifted in the shift processing in a case where the starlit sky image capture mode is selected by the switching is smaller than a shift amount of one step by which the pair of image signals are relatively shifted in a case where the normal image capture mode is selected.

* * * * *